United States Patent [19]

Kanegae et al.

[11] 4,355,359
[45] Oct. 19, 1982

[54] CONTROL SYSTEM FOR INTERNAL COMBUSTION ENGINES

[75] Inventors: Hidetoshi Kanegae, Yokohama; Masaharu Asano, Yokosuka, both of Japan

[73] Assignee: Nissan Motor Company, Limited, Yokohama, Japan

[21] Appl. No.: 132,648

[22] Filed: Mar. 21, 1980

[30] Foreign Application Priority Data

Mar. 23, 1979 [JP] Japan .................................. 54-33882
Mar. 23, 1979 [JP] Japan .................................. 54-33885

[51] Int. Cl.³ ...................... F02D 35/00; F02D 13/00
[52] U.S. Cl. ............................... 364/431.04; 123/492; 371/62
[58] Field of Search ................. 364/424, 431; 371/62; 123/480, 484, 486, 492, 493, 596; 340/347; 74/866

[56] References Cited

U.S. PATENT DOCUMENTS

| | | | |
|---|---|---|---|
| 3,436,756 | 4/1969 | Myers et al. | 340/347 R |
| 4,018,202 | 4/1977 | Gartner | 123/596 |
| 4,089,317 | 5/1978 | Drews et al. | 123/484 X |
| 4,200,064 | 4/1980 | Engele | 123/486 X |
| 4,205,376 | 5/1980 | Yoshida | 364/424 |
| 4,221,191 | 9/1980 | Asano et al. | 123/492 |
| 4,227,490 | 10/1980 | Kobayashi et al. | 123/492 |
| 4,231,091 | 10/1980 | Motz | 364/431 |
| 4,250,858 | 2/1981 | Jeenicke et al. | 123/480 |

FOREIGN PATENT DOCUMENTS 2326873 11/1973 Fed. Rep. of Germany ........ 371/62
52-33216 3/1977 Japan .................................... 74/866

Primary Examiner—Felix D. Gruber
Attorney, Agent, or Firm—Schwartz, Jeffery, Schwaab, Mack, Blumenthal & Koch

[57] ABSTRACT

A control system is disclosed which includes a digital microcomputer adapted to perform routines for controlling various operating parameters for an internal combustion engine. The system includes at least one switch adapted to detect a specified engine operating condition. Means are provided for causing the microcomputer to perform a routine required for the specified engine operating condition when the time of continuous occurrence of the specified condition exceeds a predetermined value.

10 Claims, 4 Drawing Figures

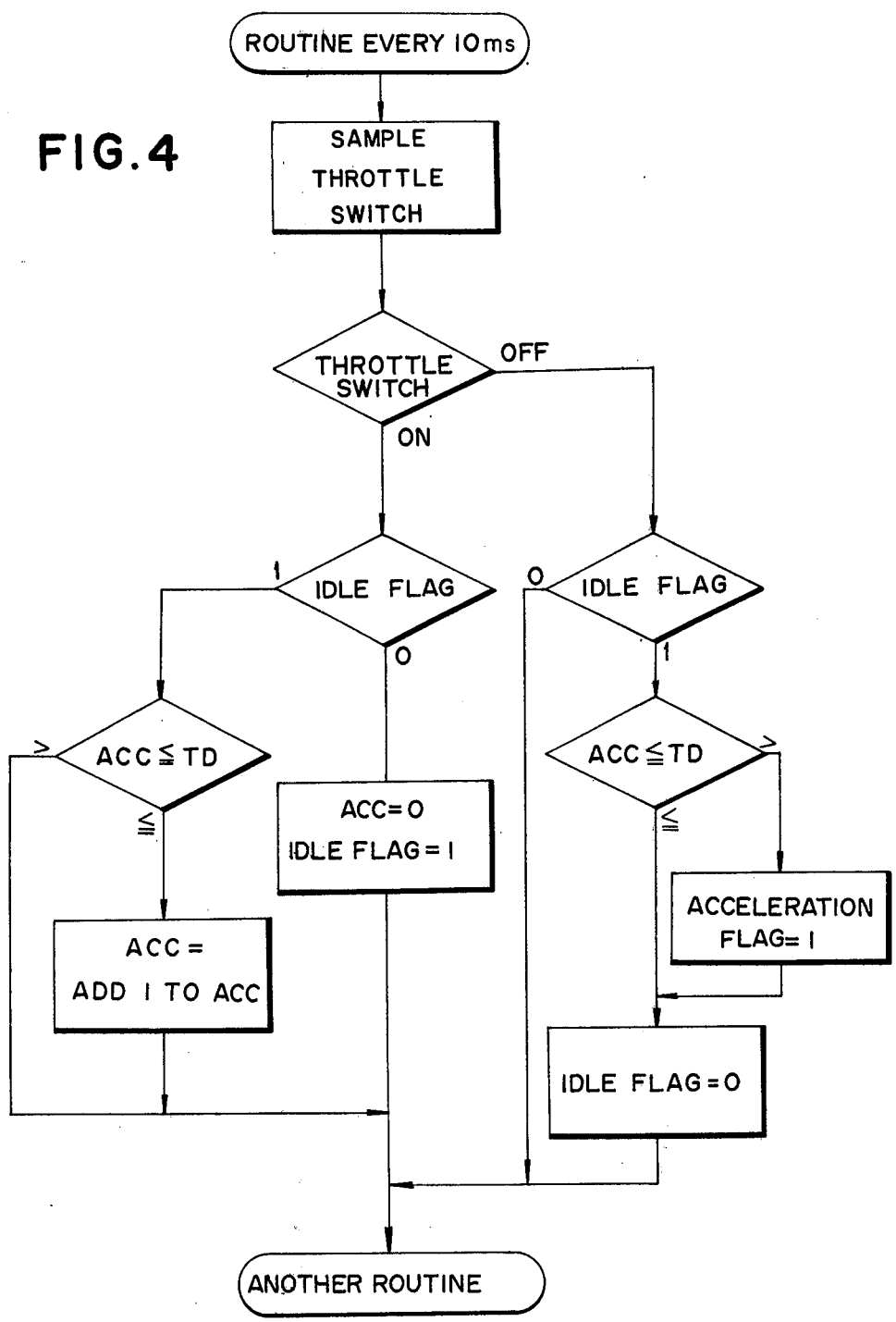

CONTROL SYSTEM FOR INTERNAL COMBUSTION ENGINES

BACKGROUND OF THE INVENTION

1. Field of the Invention

This invention relates to a control system for use with internal combustion engines and, more particularly, to a system including a microcomputer for processing information on various engine operating conditions.

2. Description of the Prior Art

There have been developed systems using a digital microcomputer for controlling various engine operating parameters such as the amount of fuel supplied for an engine, spark timing, the rate of exhaust gas recirculation. Such a control system is fed with information on various engine operating conditions in the form of analog signals representative of engine rotational speed, intake air flow rate, engine temperature, and the like. These analog signals are converted into digital signals for application to the microprocessor. The control system also receives on-off signals from various switches such as a throttle switch adapated to detect the fully closed position of the throttle valve, a neutral switch adapted to detect the neutral position of the power transmission, a starter switch adapted to detect the cranking operation of the engine, a switch adapted to detect the actuation of an air conditioner, and the like. These on-off signals are applied as interrupt signals to the microprocessor.

As an example, when the signal from the throttle switch changes to its off state, the engine is accelerating. The throttle switch is adapted to provide an ON signal at the fully closed position of the throttle valve and an OFF signal at the open position of the throttle valve. This signal change is used as an interrupt signal to cause a temporary discontinuation in a routine being performed by the microprocessor; and directs the microprocessor to enter to another routine for making corrections required during acceleration. At the end of the routine, the interrupted routine is resumed from the point at which the discontinuation occurred.

In such a conventional system where switch signals are used as interrupt signals a simple input circuit may be utilized. The system operates at a rapid response rate with respect to engine operating condition changes, but requires complicated hardware and software systems to give priority levels to the incoming switch signals as the number of the associated switches increases. In addition, due to an instantaneous change in the state of a switch which requires no actual interrupt of the program sequence, an unnecessary signal interrupt may occur to disturb other routines. For example, when the gear position of the transmission is changed, the throttle switch comes on and returns to its off state in a short time. Thus, each time the transmission is changed to another gear position, an interrupt occurs to cause entry into a routine required in acceleration such as to increase the amount of fuel supplied to the engine. When the gear position of the transmission is changed, however, this acceleration routine is unnecessary and spoils exhaust gas purifying performance.

SUMMARY OF THE INVENTION

It is therefore one object of the present invention to provide an improved control system using a microcomputer which is free from the above described disadvantages found in conventional systems.

Another object of the present invention is to eliminate the possibility of occurrence of any unnecessary interrupt in the microcomputer used for processing information on various operating conditions of an internal combustion engine.

BRIEF DESCRIPTION OF THE DRAWINGS

For a better understanding of the invention, as well as other objects and further features thereof, reference is made to the following detailed description of the invention to be read in connection with the accompanying drawings, wherein:

FIG. 4 is a flowchart used to explain the operation of the system of FIG. 3.

DESCRIPTION OF THE PREFERRED EMBODIMENTS

Figure 1:
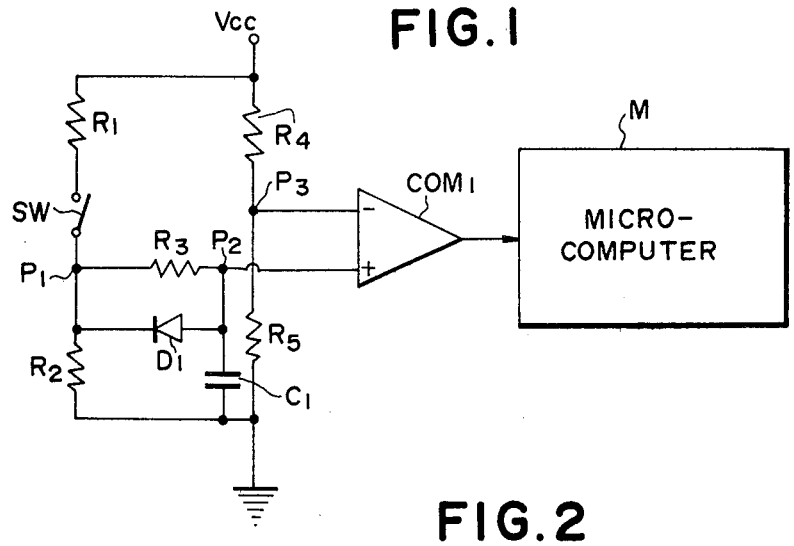
FIG. 1 is a circuit diagram showing one embodiment of a control system constructed in accordance with the present invention.

Referring now to FIG. 1, there is illustrated one preferred embodiment of a control system of the present invention. The control system comprises an interrupt signal generating circuit which is shown as including a throttle switch SW for detecting the position of a throttle valve provided in an internal combustion engine. The throttle switch SW is on when the throttle valve is at its fully closed position and off at open throttle conditions. The throttle switch SW has one terminal connected through a resistor $R_1$ to a DC voltage source. The other terminal of the throttle switch SW is connected through a resistor $R_2$ to ground and also through a resistor $R_3$ to the non-inverting input terminal of a comparator COM, the inverting input terminal of which is connected through a resistor $R_4$ to the voltage source and also through a resistor $R_5$ to ground. The resistor $R_2$ is selected to have a magnitude much lower than the resistor $R_3$. The non-inverting input terminal of the comparator COM is connected through a capacitor $C_1$ to ground. A diode $D_1$ is connected in parallel with the resistor $R_3$. THe output of the comparator COM is connected to a microcomputer M.

Figure 2:
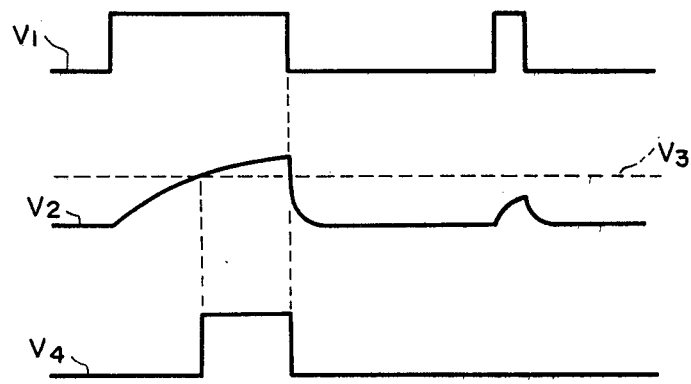
FIG. 2 shows certain wave forms used in explaining the operation of the system of FIG. 1.

When the throttle valve is at the fully closed position to turn the throttle switch SW on, the voltage $V_1$ appearing at the point $P_1$ of FIG. 1 becomes high as shown by the waveform $V_1$ of FIG. 2 and the capacitor $C_1$ is charged through the resistor $R_3$. The voltage $V_2$ at the point $P_2$ of FIG. 1 increases depending upon the time constant as shown by the waveform $V_2$ of FIG. 2. When the voltage $V_2$ reaches a reference voltage $V_3$ appearing at the point $P_3$ of FIG. 1, the output of the comparator COM changes to its high level as shown by the waveform $V_4$ of FIG. 2.

If the throttle switch SW returns to the off state in a short time after changing to the on state, the voltage $V_2$ does not reach the reference voltage $V_3$ and thus the output of the comparator COM remains low. In other words, the output of the comparator COM changes to the high level only after the throttle switch SW remains on for a predetermined time or longer. A change of the output of the comparator to the low level represents that the throttle switch SW returns from the on state to the off state.

The microcomputer M is responsive to the leading edge of the output signal of the comparator COM to handle an interrupt. That is, such an interrupt occurs only after the throttle switch SW remains in its on state for a predetermined time. This eliminates the possibility of occurrence of any unnecessary interrupt which has been found, in conventional systems, with an instantaneous change in the state of the throttle switch.

Although in FIG. 1, an interrupt signal is applied to the microcomputer only after the throttle switch remains on for a predetermined time, it should be noted that the interrupt signal generating circuit may be designed to provide an interrupt signal only after the throttle switch remains off for a predetermined time. The microcomputer may then be designed to handle an interrupt in response to the trailing edge of the output signal of the comparator. In addition, although the above embodiment has been described in connection with a throttle switch, it is to be understood that the invention also contemplates that the interrupt signal generator circuit can be used with a neutral switch, starter switch, and any other suitable switch.

Figure 3:
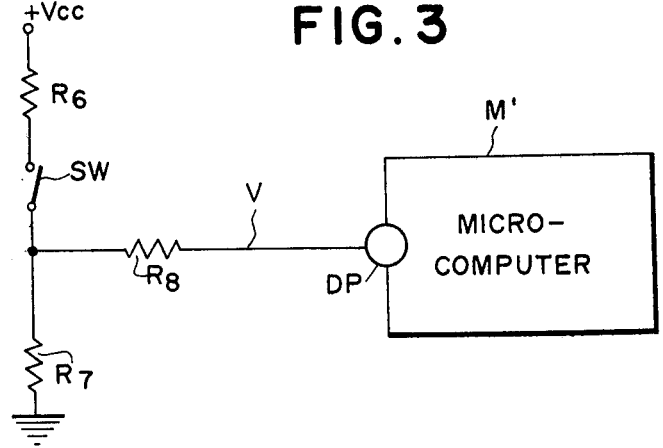
FIG. 3 is a circuit diagram showing an alternative embodiment of the present invention.

Referring to FIG. 3, there is illustrated an alternative embodiment of the present invention, in which the throttle switch SW has one terminal connected through a resistor $R_6$ to a DC voltage source and the other terminal thereof connected through a resistor $R_7$ to ground and also through a resistor $R_8$ to the digital input port DP of a microcomputer M'. When the throttle switch SW is in its on state, a constant voltage V is applied to the digital input port of the microcomputer M'.

The operation of the microcomputer M' will be described with reference to FIG. 4 which is a flowchart showing a routine entered every 10 microseconds.

First, the value of the voltage applied to the digital input port DP of the microcomputer is sampled every 10 microseconds. The sampled value is V if the throttle valve is in the fully closed position to turn the throttle switch SW on, and is 0 if the throttle valve is in the open position to turn the throttle switch SW off. The on or off state of throttle switch is then tested. If the throttle switch is on and the idle flag is at 0, the idle flag is set to 1 and the counter ACC is cleared. Thereafter, the counter ACC advances by one each time the routine is repeated as long as the throttle switch SW remains on until its content reaches a predetermined value TD.

If the throttle switch SW is off, the content of counter ACC is tested for the predetermined value TD. If the content of counter ACC is larger than the predetermined value TD, the acceleration flag is set to 1 and then the idle flag is set to 0. Otherwise, the idle flag is set to 0. That is, the acceleration flag is set to 1 when the throttle switch SW changes to its off state after it remains on for a time represented by the predetermined number of sampling operations.

If the acceleration flag is set to 1, another routine is performed for controlling spark timing, fuel timing advance and any other engine operating factor required during acceleration.

Although in FIG. 4, the routine specified by the state of the throttle switch is performed only after the number of times that the on state of the throttle switch is continuously sampled reaches or exceeds a predetermined value, it is to be noted that the microcomputer may be designed to perform the routine only after the number of times that the off state of the throttle switch is continuously sampled reaches or exceeds a predetermined value. In addition, the microcomputer may be designed to perform the routine specified by the state of the throttle switch simultaneously with the arrival of the sampling number at the predetermined value.

Although the above embodiment has been described in connection with a throttle switch, it is to be understood that the invention also contemplates use with a neutral switch, starter switch, air conditioner switch, and any other suitable switch solely and in combination.

With the present invention, it is possible to prevent the microcomputer from handling any interrupt until sufficient time lapses after a condition is established which requires that control should pass temporarily to another routine. This eliminates the possibility of occurrence of any unnecessary interrupt and holds engine running and exhaust gas purifying performances high. While the invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A control system for use with an internal combustion engine, comprising:
   (a) a digital microcomputer adapted to perform routines for controlling various operating parameters of said engine;
   (b) at least one detector for detecting a specified engine operating condition, said detector providing a signal which has a first level during the occurrence of said specified engine operating condition and has a second level during the absence of said specified operating condition; and
   (c) interrupt signal generator means for providing an interrupt signal to said microcomputer and causing said microcomputer to enter a routine required for said specified engine operating condition when the time during which said signal from said detector is in said first level exceeds a predetermined value, said interrupt signal generator means being interposed between said microcomputer and said detector.

2. A control system according to claim 1, wherein said interrupt signal generator means comprises a signal generator responsive to said detector for providing a signal increasing with time during the occurrence of said specified condition, and a comparator responsive to said signal generator for providing a high output when said signal is larger than a reference level.

3. A control system according to claim 2, wherein said microcomputer is adapted to enter the routine required for said specified condition in response to the leading edge of said output of said comparator.

4. A control system according to claim 2, wherein said microcomputer is adapted to enter the routine required for said specified condition in response to the trailing edge of said output of said comparator.

5. A control system according to claim 1, wherein said detector comprises a throttle switch adapted to become off so as to specify engine acceleration at open throttle.

6. A control system for use with an internal combustion engine, comprising:
   (a) at least one detector means for detecting a specified engine operating condition, said detector means providing a signal which has a first level during occurrence of said specified engine operating condition and has a second level in the absence of said specified operating condition; and (b) digital microcomputer means adapted to perform routines for controlling various operating parameters of said engine, said microcomputer receiving said signal from said detector means, sampling the first level of said signal at predetermined time intervals and entering a routine required for said specified operating condition when the number of times that said first level is sampled exceeds a predetermined value.

7. A control system according to claim 6, wherein said detector means comprises a throttle switch adapted to become off so as to specify engine acceleration at open throttle.

8. A control system for an internal combustion engine, comprising:

means for detecting a specified engine operating condition and producing an output, said output being a first state signal in response to the occurrence of said specified operating condition;

means for sensing said output signal;

means for comparing the time duration of said first state signal with a predetermined time;

means for generating an interrupt signal when said first state signal duration exceeds said predetermined time; and a microcomputer operating under a program control sequence in response to sensed engine operating conditions for controlling various engine operating parameters, said microcomputer being responsive to said interrupt signal to temporarily stop execution of said program control sequence to start executing an interrupt routine for controlling said parameters during said specified operating condition.

9. A system as set forth in claim 8, wherein said interrupt signal generating means comprises an RC time delay circuit.

10. A system as set forth in claim 8, wherein said interrupt signal generating means comprises means for sampling said detecting means output at predetermined time intervals and counting a number of sequential samples of said first state signal.

* * * * *